United States Patent
Okamura et al.

(10) Patent No.: US 10,921,790 B2
(45) Date of Patent: Feb. 16, 2021

(54) MODULAR COMPONENT MOUNTING APPARATUS AND METHOD

(71) Applicant: Panasonic Intellectual Property Management Co., Ltd., Osaka (JP)

(72) Inventors: Hiroshi Okamura, Osaka (JP); Kazuki Takatori, Osaka (JP); Shimpei Sugino, Osaka (JP); Hiroki Yukawa, Osaka (JP); Mami Kikuchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 231 days.

(21) Appl. No.: 16/152,497

(22) Filed: Oct. 5, 2018

(65) Prior Publication Data

US 2019/0113908 A1 Apr. 18, 2019

(30) Foreign Application Priority Data

Oct. 16, 2017 (JP) .................. 2017-200642

(51) Int. Cl.
*G05B 19/04* (2006.01)
*G05B 19/418* (2006.01)

(52) U.S. Cl.
CPC .......... *G05B 19/41865* (2013.01); *G05B 2219/34379* (2013.01); *G05B 2219/50386* (2013.01)

(58) Field of Classification Search
None
See application file for complete search history.

(56) References Cited

U.S. PATENT DOCUMENTS

| | | | | |
|---|---|---|---|---|
| 6,000,123 | A * | 12/1999 | Munezane | H05K 13/041 29/740 |
| 6,176,007 | B1 * | 1/2001 | Kashiwagi | H05K 13/0434 29/729 |
| 6,466,539 | B1 * | 10/2002 | Kramer | G06F 11/0757 370/216 |
| 6,594,887 | B1 * | 7/2003 | Okuda | H05K 13/0434 29/739 |
| 7,797,819 | B2 * | 9/2010 | Kawasumi | H05K 13/0404 29/740 |

(Continued)

FOREIGN PATENT DOCUMENTS

JP 2017-168539 A 9/2017

OTHER PUBLICATIONS

Zhakypov et al. 'Modular and reconfigurable desktop microfactory for high precision manufacturing' Int J Adv Manuf Technol (2017) 90:3749-3759, published Nov. 14, 2016.*

(Continued)

*Primary Examiner* — Bernard G Lindsay
(74) *Attorney, Agent, or Firm* — Pearne & Gordon LLP

(57) ABSTRACT

A manufacturing-job apparatus includes a control module, a holding module, and a job module. The holding module is configured to hold a job object. The job module is configured to execute a job for the job object. The control module includes a communication unit and a common interface. The communication unit is configured to communicate with each of the holding module and the job module. The common interface is configured to supply motive power to both of the holding module and the job module.

14 Claims, 10 Drawing Sheets

(56) References Cited

U.S. PATENT DOCUMENTS

| | | | |
|---|---|---|---|
| 2004/0211055 A1* | 10/2004 | Belchamber | B23P 21/004 |
| | | | 29/700 |
| 2008/0147232 A1* | 6/2008 | Kuribayashi | H05K 13/087 |
| | | | 700/160 |
| 2008/0221723 A1* | 9/2008 | Lee | H05K 13/085 |
| | | | 700/112 |
| 2012/0012645 A1* | 1/2012 | Motomura | H05K 3/363 |
| | | | 228/179.1 |
| 2015/0250025 A1* | 9/2015 | Bach | H05B 1/0202 |
| | | | 219/209 |
| 2019/0245294 A1* | 8/2019 | Forcht | H01R 13/514 |

OTHER PUBLICATIONS

'Operating Instructions Maintenance Manual Modular High Speed Placement Machine CM602-L' Panasonic, 2006.*

* cited by examiner

MODULAR COMPONENT MOUNTING APPARATUS AND METHOD

CROSS-REFERENCE TO RELATED APPLICATION

This application is based upon and claims the benefit of priority of Japanese Patent Application No. 2017-200642, filed on Oct. 16, 2017, the entire content of which is incorporated herein by reference.

TECHNICAL FIELD

This disclosure relates generally to manufacturing job apparatuses, control modules and using methods of manufacturing job apparatus, more particularly, to a manufacturing job apparatus of executing a job for a job object, a control module and a using method of the manufacturing-job apparatus.

BACKGROUND ART

For example, a Document 1 (JP 2017-168539 A) discloses a mounting apparatus (a component mounting apparatus) that mounts (fits) a component on a substrate as a job object. The mounting apparatus disclosed in the Document 1 is to mount the component on the substrate while the component is provided on a lower surface thereof with an adhesive or paste such as flux.

In a process of manufacturing a product such as an electronic device or the like, manufacturing job apparatuses (also including the mounting apparatus) may be used, which execute various jobs for job object. Examples of the manufacturing-job apparatuses other than the mounting apparatus may include an apparatus for applying creamy solder on a substrate.

However, the mounting apparatus in the Document 1 can execute only a predetermined job (i.e., mounting of the component) with respect to the job object. Therefore, for example when it is desired to change nature, quality and the like of an executable job, a design change of the whole mounting apparatus would be required, and it would lead to a change on a large scale.

SUMMARY

The present disclosure is directed to a manufacturing-job apparatus, a control module and a using method of the manufacturing job apparatus, which be easily changeable in nature, quality and the like of an executable job.

A manufacturing-job apparatus according to an aspect of the present disclosure includes a control module, a holding module, and a job module. The holding module is configured to hold a job object. The job module is configured to execute a job for the job object. The control module includes a communication unit and a common interface. The communication unit is configured to communicate with each of the holding module and the job module. The common interface is configured to supply motive power to both of the holding module and the job module.

BRIEF DESCRIPTION OF THE DRAWINGS

The figures depict one or more implementations in accordance with the present disclosure, by way of example only, not by way of limitations. In the figures, like reference numerals refer to the same or similar elements.

DETAILED DESCRIPTION

First Embodiment (1) Outline

Figure 1:
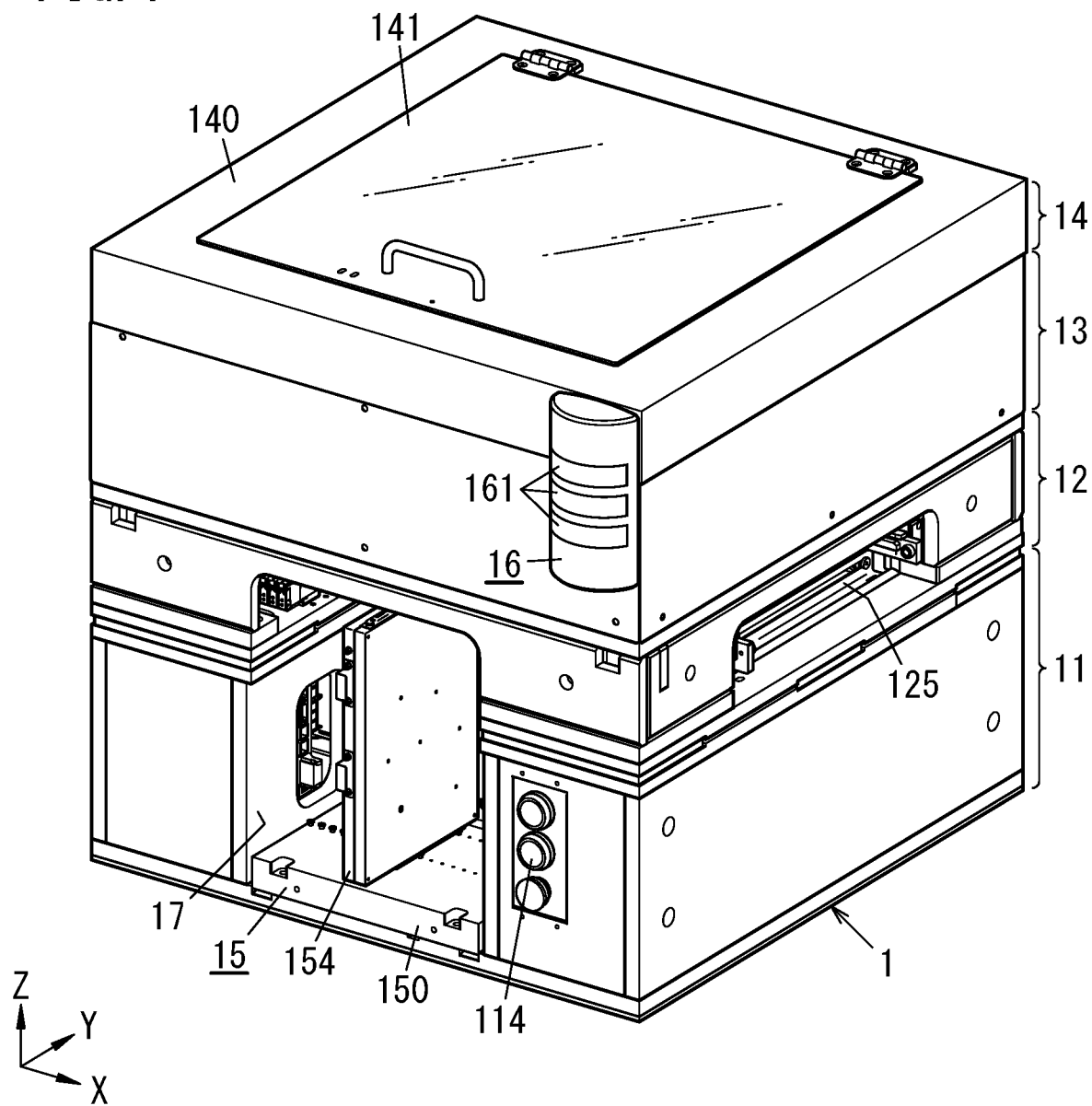
FIG. 1 is a perspective view of an external appearance of a manufacturing-job apparatus according to a First Embodiment.

An outline of a manufacturing-job apparatus 1 according to the present embodiment will be explained with reference to FIGS. 1 to 2B. FIG. 2A is a perspective view of the manufacturing job apparatus 1 in a state where a cover module 14 (refer to FIG. 1) described later is removed from the manufacturing job apparatus 1. FIG. 2B is a schematic enlarged view of a region A1 shown in FIG. 2A. To the manufacturing job apparatus 1, connected may be a pipe for circulating cooling water, a cable for supplying electric power, a pipe for supplying pneumatic pressure (positive pressure or vacuum) and so on, although those illustrations are appropriately omitted.

The manufacturing job apparatus 1 may be used for manufacturing job of various products (such as an electronic device, car, clothing, food, medicine and crafted product) in facilities (e.g., a factory, research laboratory, office, store, educational institution and the like). Examples of the "job" mentioned in this disclosure include various jobs to be executed for job objects in manufacturing of products. More specifically, examples of the "job" may include mounting, coating, printing, pressing, cutting, welding and filming (photographing). The "job object" mentioned in this disclosure is an object to which the job such as processing is subjected by the manufacturing-job apparatus 1. For example, in case of job of mounting a first object on a second object, the second object corresponds to the "job object".

In the present embodiment, it is as one example explained that the manufacturing job apparatus 1 is used for manufacturing of electronic devices in a factory and it is a mounting apparatus for performing the job of mounting the first object on the second object (job object). A general electronic device includes various circuit blocks such as a power supply circuit and a control circuit. Those circuit blocks are manufactured through, for example, a solder applying process, a mounting process and a soldering process in that order. In the solder applying process, creamy solder is applied (or printed) on a substrate (printed wiring board). In the mounting process, a component(s) (electronic component(s)) is mounted on the substrate. In the soldering process, the substrate with the component is heated in a reflow furnace to melt the creamy solder, thereby the soldering being performed. The manufacturing job apparatus 1 (mounting apparatus), in the mounting process, performs the job of mounting a component P1 (refer to FIG. 2B) as the first object to a substrate B1 (refer to FIG. 2A) as the second object (job object). In the present embodiment, as one example, explained is a case where the manufacturing job apparatus 1 is used for mounting of the component P1 by the Surface Mount Technology (SMT). However, it is not limited to the SMT, but the manufacturing job apparatus 1 may be used for mounting of the component P1 by the Insertion Mount Technology (IMT).

The manufacturing job apparatus 1 according to the present embodiment includes a control module 11, a holding module 12 and a job module 13. The holding module 12 is configured to hold the job object. The job module 13 is configured to execute a job for the job object (substrate B1). The control module 11 has a function of controlling the holding module 12 and the job module 13. That is, the manufacturing job apparatus 1 includes at least three modules including the control module 11, the holding module 12 and the job module 13, which are modularized by functions. Each of the at least three modules of the manufacturing-job apparatus 1 may be appropriately selected according to functions to be needed for the manufacturing job apparatus 1 from more kinds of modules respectively having functions different from each other.

In the present embodiment, the manufacturing job apparatus 1 performs the job of mounting the component P1 on the substrate B1 as the job object. Accordingly, the holding module 12 has a function of holding the substrate B1. More specifically, the holding module 12 includes a conveyance device that conveys the substrate B1 as the second object from the outside of the manufacturing-job apparatus 1 into an inside space of the manufacturing-job apparatus 1 and then conveys the substrate B1, for which the job has been completed, from the inside space to the outside. The holding module 12 maintains holding the substrate B1 in the inside space of the manufacturing-job apparatus 1 while at least performing the job for the substrate B1 (mounting of the component P1). The job module 13 executes the job of mounting the component P1 on the substrate B1. That is, the job module 13 is a picking and placing device that picks up the component P1 as the first object, moves the picked-up component P1 onto the substrate B1 and releases the component P1 (cancels the picked-up state) on the substrate B1 to mount the component P1 on the substrate B1.

In the present embodiment, the control module 11 has a function as a master in the manufacturing-job apparatus 1, and controls the other modules (holding module 12 and job module 13) as slaves. Although described later in detail, the control module 11 includes a communication unit 111 (refer to FIG. 4) and a common interface 112 (refer to FIG. 4). The communication unit 111 is configured to communicate with each of the holding module 12 and the job module 13. The common interface 112 is configured to supply motive power to both of the holding module 12 and the job module 13. The "motive power" mentioned in this disclosure means energy to be needed for operation of the holding module 12 and the job module 13, and includes electric power (AC power or DC power), pneumatic pressure (positive pressure or vacuum), oil pressure, water pressure and so on. In other words, if any module has an electric motor, the electric power which is energy for driving at least the electric motor may be used as the "motive power". The control module 11 communicate, using the communication unit 111, with the holding module 12 and the job module 13 and supplies the motive power from the common interface 112 to the holding and job modules 12 and 13 to control the holding and job modules 12 and 13.

The manufacturing job apparatus 1 according to the present embodiment further includes the cover module 14 and a feeder module 15, and a signal lamp 16 (refer to FIG. 1) in addition to the control module 11, the holding module 12 and the job module 13. In the present embodiment, the control module 11 is provided at the bottom (as the lowest stage), and the holding module 12, the job module 13 and the cover module 14 are combined with the control module 11 to be stacked in that order on the control module 11. The feeder module 15 is housed in a recess 17 formed over the control module 11 and the holding module 12.

Although described later in detail, the cover module 14 corresponds to a terminal module that is one of a plurality of modules, which are connected in series to the control module 11. On a supply passage of the motive power, the cover module 14 is provided on most downstream of the plurality of modules. The feeder module 15 is configured to feed the first object (component P1) to the job module 13. That is, the job module 13 receives the component P1 fed by the feeder module 15, and then mounts the component P1 on the substrate B1 held by the holding module 12. The signal lamp 16 is attached to the cover module 14. The signal lamp 16 changes its display mode (e.g., its light emission color) according to an operation state of the manufacturing job apparatus 1 to visualize the operation state.

(2) Details

Hereinafter, the manufacturing job apparatus 1 according to the present embodiment will be explained mainly with reference to FIGS. 1 to 4.

In the following explanations, a direction in which the substrate B1 (as the job object) is conveyed in the inside space of the manufacturing job apparatus 1 is defined as an "X-axis direction". Also, a direction orthogonal to the X-axis direction in a horizontal plane is defined as a "Y-axis direction". Furthermore, a direction along a vertical direction is defined as a "Z-axis direction". In short, the X-axis, Y-axis and Z-axis directions are orthogonal to one another. In case of distinguishing a positive direction of the Z-axis from a negative direction of the Z-axis, the positive and negative directions of the Z-axis are respectively defined as "upward" and "downward" based on a direction of an arrow shown in FIG. 1. Similarly, in case of distinguishing a positive direction of the X-axis from a negative direction of the X-axis, the positive and negative directions of the X-axis are respectively defined as "rightward" and "leftward". Also, in case of distinguishing a positive direction of the Y-axis from a negative direction of the Y-axis, the positive and negative directions of the Y-axis are respectively defined as "backward" and "forward". Arrows of the "X-axis", "Y-axis" and "Z-axis" directions in some drawings are illustrated merely for convenience of explanation, and have no entity. The purpose of the directions defined above is not to restrict a use form of the manufacturing job apparatus 1 (direction on use). For example, the manufacturing job apparatus 1 may be used in a state where the X-axis and Y-axis directions are slightly inclined with respect to the horizontal plane.

(2.1) Overall Structure

As described above, the manufacturing job apparatus 1 according to the present embodiment includes the control module 11, the holding module 12, the job module 13, the cover module 14, the feeder module 15 and the signal lamp 16.

Regarding the control module 11, the holding module 12, the job module 13 and the cover module 14, the control module 11 is disposed as the lowest stage, and the holding module 12, the job module 13 and the cover module 14 are stacked in that order in the Z-axis direction. The recess 17 is disposed in front faces of the control module 11 and the holding module 12, and formed over the control module 11 and the holding module 12. The recess 17 is opened forward. The feeder module 15 is housed in the recess 17. The signal lamp 16 is fixed on front faces of the job module 13 and the cover module 14 over a border therebetween.

Figure 2:
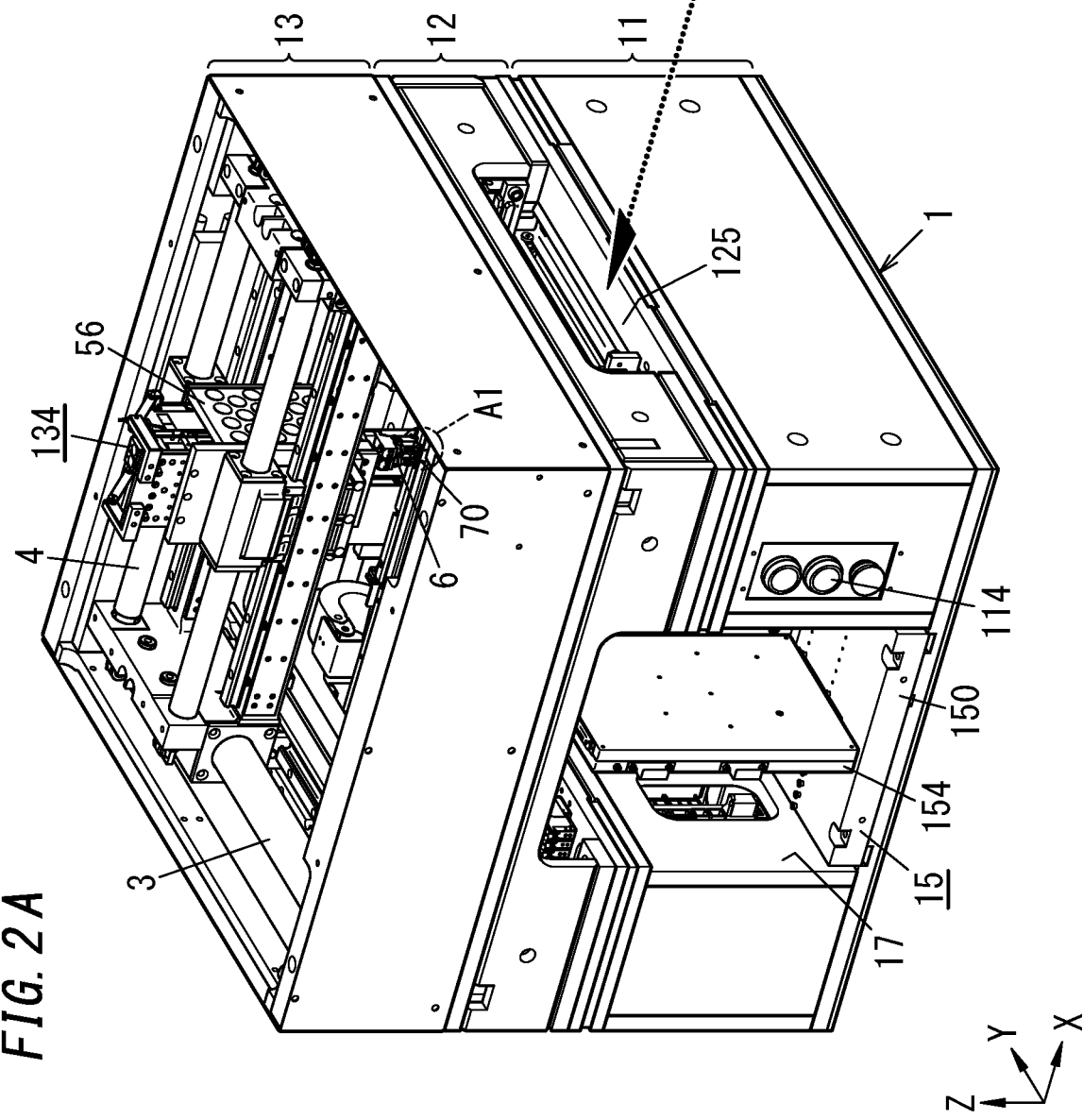
FIG. 2A is a perspective view of the manufacturing job apparatus in a state where a cover module is removed from the manufacturing job apparatus.
FIG. 2B is a schematic enlarged view of a region A1 shown in FIG. 2A.
Figure 3:
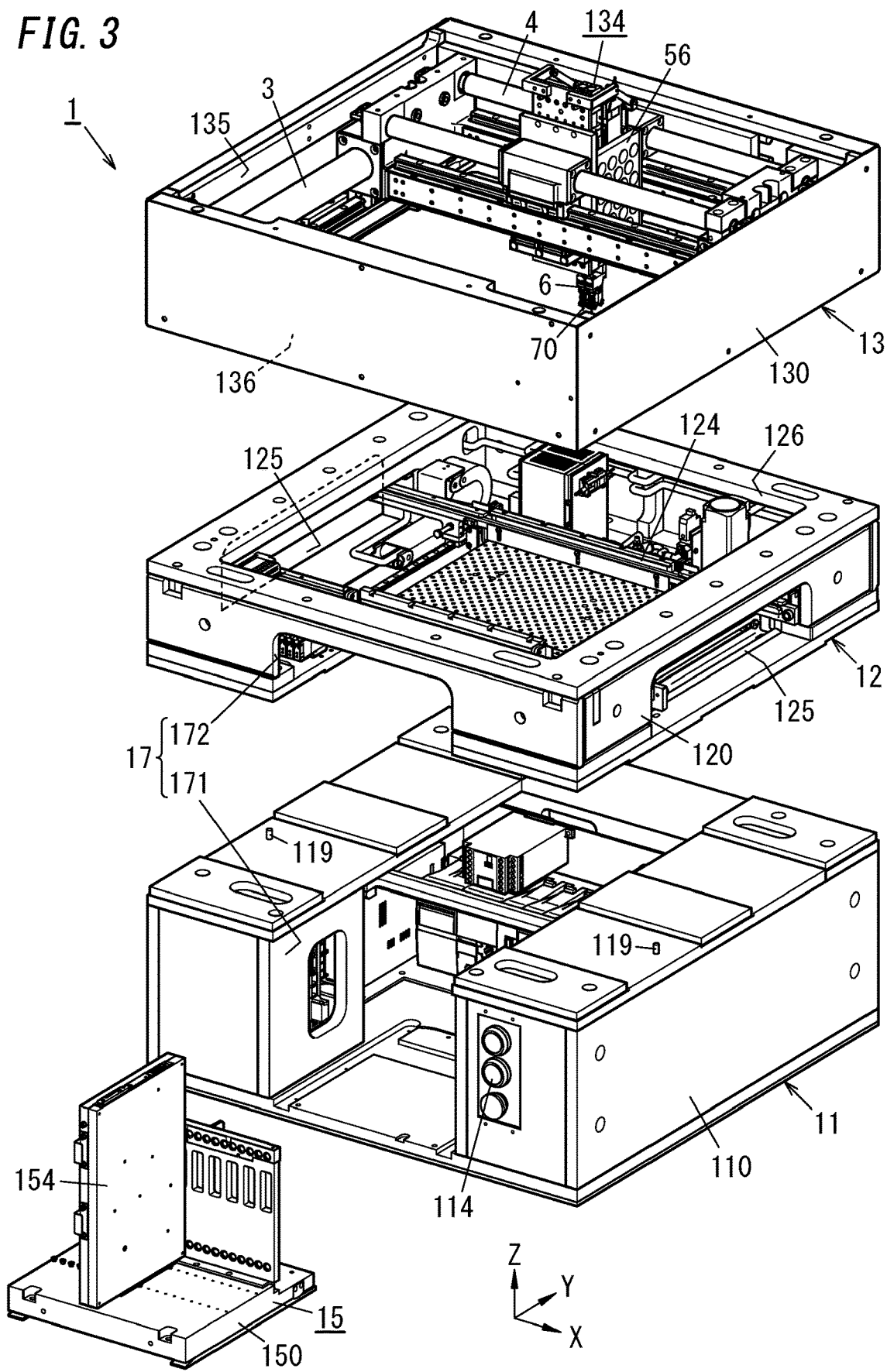
FIG. 3 is an exploded perspective view of the manufacturing job apparatus except the cover module.

As shown in FIG. 2A, the manufacturing-job apparatus 1 is configured so that the cover module 14 can be physically separated (removed) from the job module 13. The example of FIG. 2A illustrates a state where the cover module 14 together with the signal lamp 16 is removed. Also as shown in FIG. 3, the control module 11, the holding module 12, the job module 13 and the feeder module 15 can be physically separated. That is, the manufacturing job apparatus 1 is configured by combining the plurality of modules (five modules herein) of the control module 11, the holding module 12, the job module 13, the cover module 14 and the feeder module 15, which can be physically separated. The plurality of modules are coupled with each other by fasteners such as screws.

As shown in FIG. 1, in a state where the plurality of modules are combined, the manufacturing job apparatus 1 can be treated as a single apparatus in which the plurality of modules are integrated. In this state, the manufacturing job apparatus 1 has, for example, an approximate cubic shape, where dimensions thereof in three axis directions of the X-axis, Y-axis and Z-axis directions are substantially equal to each other. The dimension of each side of the cubic shape is, as one example, set to be more than or equal to 500 mm, but less than or equal to 1000 mm, more preferably, substantially equal to 600 mm. By setting to such dimensions, the manufacturing job apparatus 1 can be used as a desk top type of apparatus, and can be therefore easily installed not only in a factory but also in other facilities (e.g., a research laboratory, office, store, educational institution and the like). Also another apparatus can be placed in an empty space generated above the manufacturing-job apparatus 1, when viewed from the manufacturing-job apparatus 1, for example.

The manufacturing job apparatus 1 is configured so that the control module 11 is bidirectionally communicatable with each of the holding module 12, the job module 13 and the feeder module 15. Accordingly, the plurality of modules, which can be physically separated, are linked to operate as the single manufacturing-job apparatus 1. The manufacturing-job apparatus 1 is further configured to communicate, through the control module 11, with various installation apparatuses, communication terminals or the like other than the manufacturing-job apparatus 1.

The manufacturing-job apparatus 1 is connected, via the control module 11, to all of an electric power source So1, a positive pressure source So2 and a vacuum source So3, which are supply sources of the motive power. In other words, the manufacturing-job apparatus 1 is configured so that the control module 11 acquires the motive power for each module once and then distributes the motive power to the modules other than the control module 11.

Herein, the holding module 12 and the job module 13 of the present embodiment are connected, in series to the control module 11, on a supply passage 118 through which the motive power is supplied from the common interface 112 of the control module 11. That is, when focused on the supply passage 118 of the motive power, the holding module 12 and the job module 13 have a relationship of a series-connection with respect to the control module 11. Therefore, the motive power for the holding module 12 is supplied from the control module 11 directly to the holding module 12, and the motive power for the job module 13 is supplied from the control module 11 to the job module 13 through the holding module 12.

According to the above-mentioned configuration, since the control module 11 includes the common interface 112, the motive power can be supplied from the control module 11 with respect to various kinds of modules, as long as the kinds of modules are the holding module 12 and the job module 13 conforming to the common interface 112. Furthermore since the control module 11 includes the communication unit 111 that communicates with each of the holding module 12 and the job module 13, it is possible to combine various kinds of modules, as long as the kinds of modules are the holding module 12 and the job module 13 having a function for communication with the communication unit 111. Thus, in the manufacturing-job apparatus 1 according to the present embodiment, various kinds of holding modules 12 and job modules 13 can be selectively coupled (combined) to the control module 11.

For example when the common interface 112 has an aspect capable of supplying, as the motive power, both of the electric power and the pneumatic pressure, the combination can be realized with even any of: the holding module 12 or job module 13 to be operated with the electric power; and the holding module 12 or job module 13 to be operated with the pneumatic pressure. In other words, even in case connecting the holding module 12 and the job module 13, which are operated with only the electric power, the motive power can be supplied to the holding module 12 and the job module 13, depending on the control module 11 including the common interface 112 applicable to both of the electric power and the pneumatic pressure. Also the holding module 12 and the job module 13, which are operated with only the pneumatic pressure, can be combined with the control module 11.

As a result, the holding module 12 and the job module 13 to be combined with the control module 11 can be selected from various kinds of holding modules 12 and job modules 13, and the manufacturing-job apparatus 1 is easily changeable in nature, quality and the like of an executable job. That is, changing the holding module 12 or the job module 13 to be combined with the control module 11 can easily change in nature, quality and the like of an executable job, as the manufacturing-job apparatus 1.

(2.2) Control Module

Figure 4:
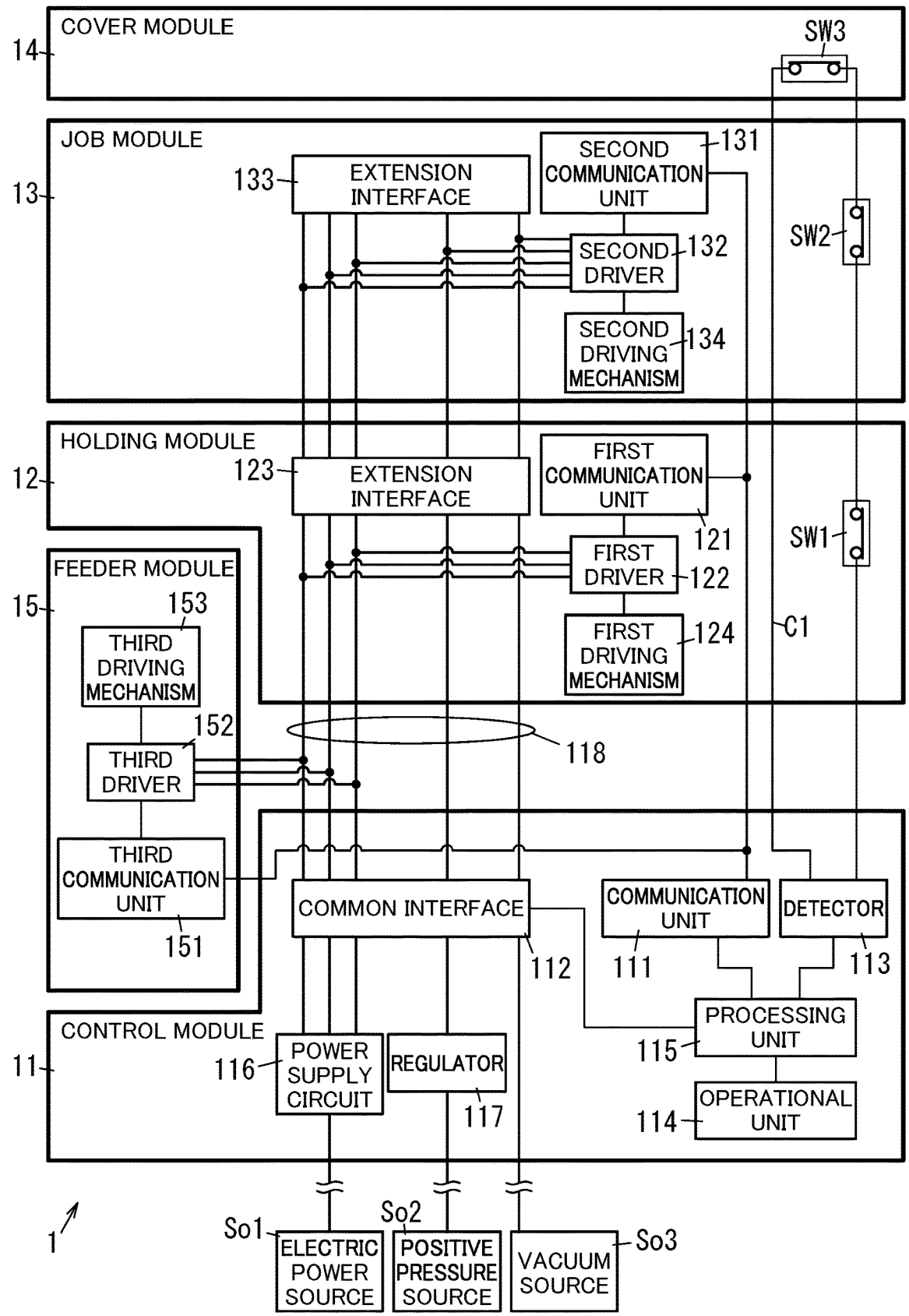
FIG. 4 is a block diagram of the manufacturing-job apparatus.
Figure 5:
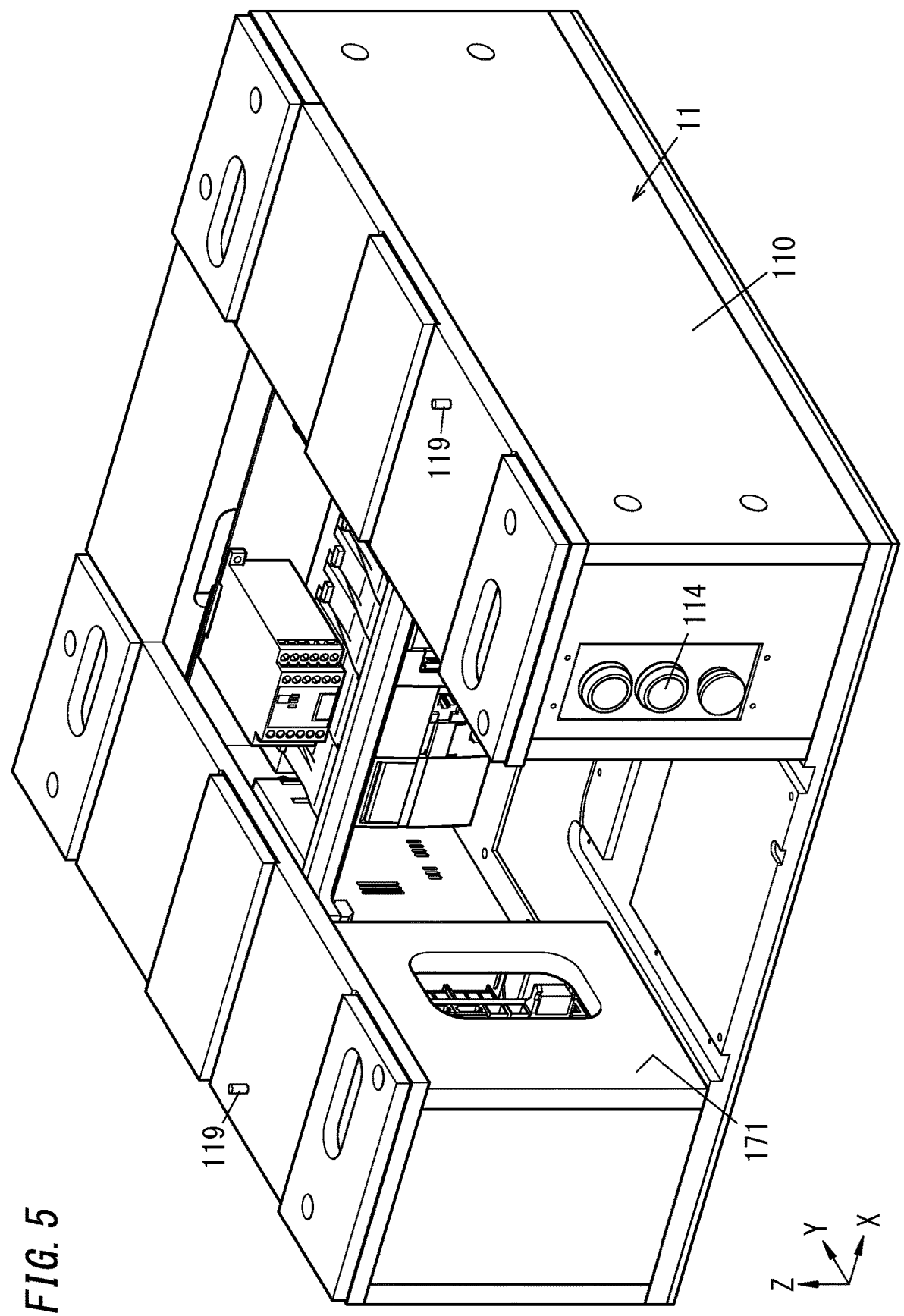
FIG. 5 is a perspective view of a control module of the manufacturing-job apparatus.

As shown in FIGS. 4 and 5, the control module 11 includes a casing 110, the communication unit 111, the common interface 112, a detector 113, an operational unit 114, a processing unit 115, a power supply circuit 116 and a regulator 117. FIG. 4 is a block diagram showing a schematic relation of connection among the control module 11, the holding module 12, the job module 13 and the cover module 14. Illustrations of the signal lamp 16 and so on are appropriately omitted from FIG. 4.

The casing 110 has an approximate square shape in planar view (when viewed from one direction along the Z-axis), and a rectangular parallelepiped shape that is flat in the Z-axis direction. The casing 110 has a front surface with a first recess 171 recessed in the positive direction of the Y-axis. The first recess 171 is opened upward. The first recess 171 together with a second recess 172 (described later) constitute the recess 17 for housing the feeder module 15.

Herein the control module 11 further includes a pair of positioning pins 119 projected upward from an upper surface of the casing 110. The paired respective positioning pins 119 are disposed on both sides of the first recess 171 in the X-axis direction. In a state where the holding module 12 is stacked on the control module 11, the respective positioning pins 119 are inserted in paired positioning holes formed in a lower surface of the holding module 12. Thus, in the state where the holding module 12 is stacked on the control module 11, the control module 11 and the holding module 12 can be relatively positioned in the X-axis and Y-axis directions. Assembly work for assembling the holding module 12 with the control module 11 is therefore facilitated relatively.

The communication unit 111 is disposed in the casing 110. In the present embodiment, the communication unit 111 uses, as a communication system, a wire communication system that conforms to EtherCAT (registered trademark), as one example. That is, the communication unit 111 of the control module 11 is connected to the holding module 12 and the job module 13 with a signal line, and communicates with each of the holding module 12 and the job module 13 through the signal line.

The common interface 112 is an interface for supplying the motive power to both of the holding module 12 and the job module 13. In the present embodiment, as one example, the common interface 112 outputs both of the electric power and the pneumatic pressure, as the motive power. More specifically, the common interface 112 outputs three kinds of electric power: AC 200V, DC 24V and DC 48V. The common interface 112 further outputs two kinds of pneumatic pressure: positive pressure and vacuum pressure. For this reason, the common interface 112 has, as the supply passage 118 of the motive power, a five-system of supply passage 118 so as to output five kinds of motive power in all. In FIG. 4, the supply passage 118 of the motive power is schematically illustrated for each system by a single line, but, a two-wire type (or a three-wire type) may be actually used for each system of supply passage 118 in a case of the electric power, for example.

The common interface 112 includes a plurality of kinds of connection parts, such as a terminal (connector) for electrical connection and a connection port for pneumatic pressure, to deal with the kinds of motive power. The common interface 112 may be disposed so that at least a part thereof is exposed from the upper surface of the casing 110. In this case, while the holding module 12 is stacked on the control module 11, the holding module 12 is connected to the common interface 112, and accordingly, the motive power can be supplied from the common interface 112 to the holding module 12 through the supply passage 118.

The electric power source So1 is connected to the common interface 112 with the power supply circuit 116 interposed therebetween. The positive pressure source So2 is connected to the common interface 112 with the regulator 117 interposed therebetween. The vacuum source So3 is also connected to the common interface 112. Thus, the electric power source So1, the positive pressure source So2 and the vacuum source So3 (as the supply sources of the motive power) are all connected to the control module 11. Therefore, the control module 11 aggregately acquires the motive power for the modules in the manufacturing job apparatus 1 and distributes the motive power from the common interface 112 to the modules other than the control module 11.

The detector 113 detects whether or not the terminal module (the cover module 14 in this embodiment) is in connection with the control module 11. The detector 113 is configured to output an error signal to the processing unit 115, when detecting that the terminal module is not in connection with the control module 11. Base on reception of the error signal, the processing unit 115 stops supplying of the motive power (at least the electric power) from the common interface 112.

More specifically, the detector 113 monitors a state of a monitoring target circuit C1 that includes: a first switch SW1 of the holding module 12, a second switch SW2 of the job module 13, and a third switch SW3 of the cover module 14 (described later). The detector 113 determines "in connection", when the first, second and third switches SW1, SW2, SW3 are all in close, that is, the monitoring target circuit C1 is in closed circuit. On the other hand, the detector 113 determines "in non-connection", when at least one of the first, second and third switches SW1, SW2, SW3 is in open. In other words, the monitoring target circuit C1 includes at least the third switch SW3 of the cover module 14 (as the terminal module), and it is determined "in connection", only when the cover module 14 is in connection. In this manner, the detector 113 can detect whether or not the terminal module (cover module 14) (to be provided on most downstream of the plurality of modules, which are connected in series to the control module 11, on the supply passage of the motive power) is in connection to the control module 11.

The operational unit 114 is disposed in the front surface of the casing 110. The operational unit 114 may include, for example, a power switch, a run/stop switch, and an emergency switch and so on. The operational unit 114 accepts an operation from a user of the manufacturing-job apparatus 1 and outputs, to the processing unit 115, an operational signal in response to the operation.

The processing unit 115 is mainly configured by a computer including a processor and a memory. The processor functions as the processing unit 115 by executing an appropriate program stored in the memory. The processing unit 115 has at least a function of controlling the communication unit 111.

The power supply circuit 116 is connected to the electric power source So1. The power supply circuit 116 appropriately converts the electric power supplied from the electric power source So1. In the present embodiment, the power supply circuit 116 outputs at least three kinds of electric power: AC 200V, DC 24V and DC 48V to the common interface 112. The electric power source So1 may be for example a commercial power source outputting three-phase AC.

The regulator 117 is connected to the positive pressure source So2. The regulator 117 reduces the pneumatic pressure (positive pressure) supplied from the positive pressure source So2 so that the pressure is stabilized, and outputs the reduced pressure to the common interface 112.

(2.3) Holding Module

Figure 6:
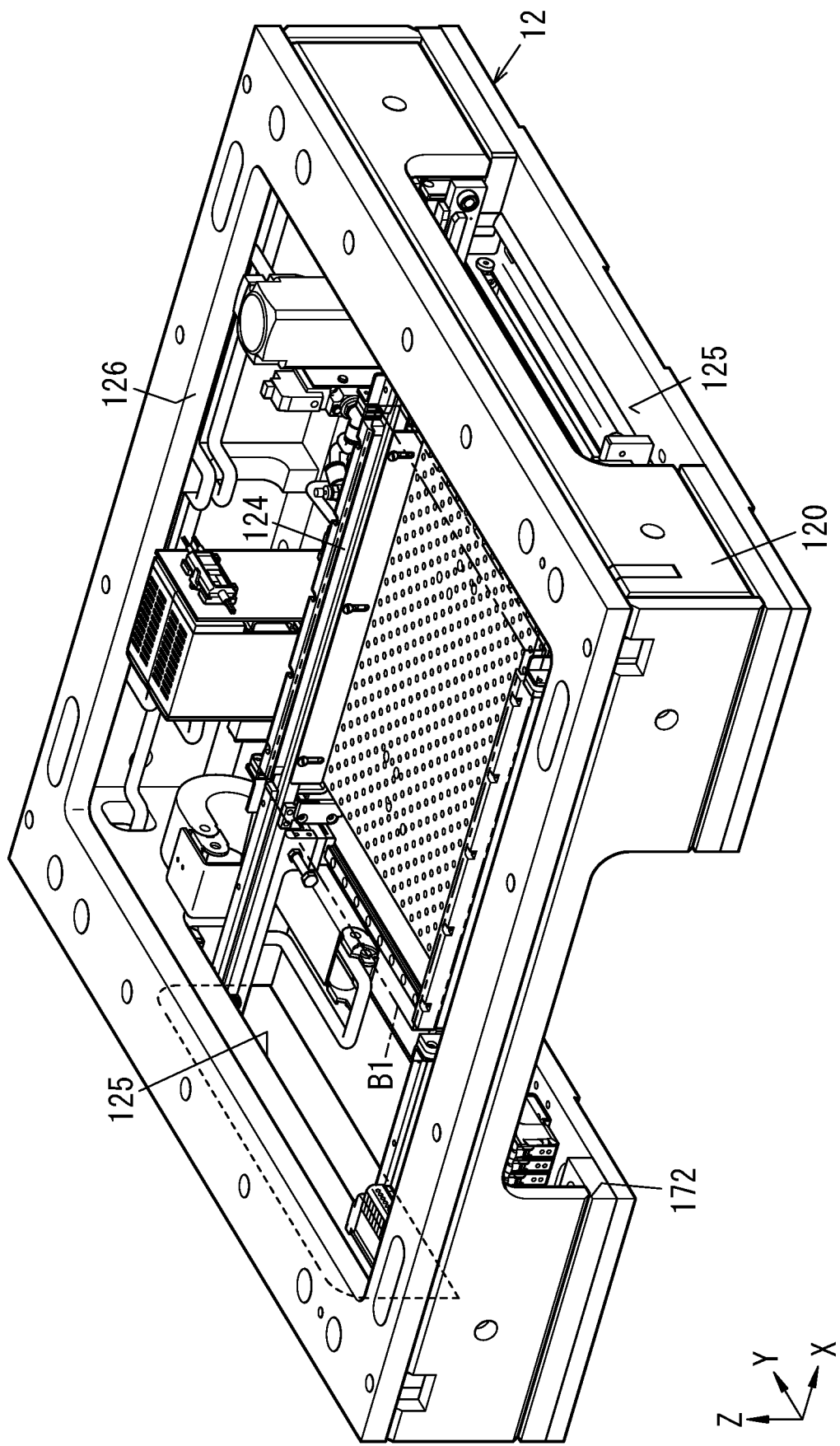
FIG. 6 is a perspective view of a holding module of the manufacturing-job apparatus.

As shown in FIGS. 4 and 6, the holding module 12 includes a casing 120, a first communication unit 121, a first driver 122, an extension interface 123, a first driving mechanism 124 and the first switch SW1.

The casing 120 has an approximate square shape, similar to the casing 110 of the control module 11, in planar view (when viewed from one direction along the Z-axis), and a rectangular parallelepiped shape that is flat in the Z-axis direction. The casing 120 has a front surface with a second recess 172 recessed in the positive direction of the Y-axis. The second recess 172 is opened downward.

The casing 120 has substrate passing holes 125 that are paired and disposed in both end surfaces of the casing 120 in the X-axis direction, each substrate passing hole 125 penetrating in the X-axis direction. The casing 120 further has an opening 126 that is formed in an upper surface of the casing 120 to leave an edge part along four sides of the upper surface. The casing 120 therefore have an inside space accessible from both sides thereof in the X-axis direction through the paired substrate passing holes 125 and further accessible from the above thereof through the opening 126.

Herein similarly to the control module 11, preferably, the holding module 12 further includes a pair of positioning pins projected upward from the upper surface of the casing 120. In a state where the job module 13 is stacked on the holding module 12, the respective positioning pins are inserted in paired positioning holes formed in a lower surface of the job module 13. Thus, in the state where the job module 13 is stacked on the holding module 12, the holding module 12 and the job module 13 can be relatively positioned in the X-axis and Y-axis directions. Assembly work for assembling the job module 13 with the holding module 12 is therefore facilitated relatively.

The first communication unit 121 is disposed in the casing 120. The first communication unit 121 is connected to the communication unit 111 of the control module 11 with a signal line, and bidirectionally communicates with the communication unit 111 through the signal line.

The first driver 122 is a driver to drive the first driving mechanism 124. The first driver 122 is connected to the common interface 112 of the control module 11, and obtains, from the common interface 112, at least the motive power needed for driving the first driving mechanism 124. In the present embodiment, since the first driving mechanism 124 is electrically operated, the first driver 122 obtains at least the electric power from the common interface 112. The first driver 122 may include a control circuit for controlling the first driving mechanism 124.

The extension interface 123 is an interface to supply the motive power to another module that is connected on a downstream side of the supply passage 118 in which the motive power is supplied from the common interface 112. When focused on the holding module 12, the job module 13 is connected on the downstream side of the supply passage 118, and the extension interface 123 is accordingly an interface to supply the motive power to the job module 13 (another module).

Similarly to the common interface 112, the extension interface 123 includes a plurality of kinds of connection parts, such as a terminal (connector) for electrical connection and a connection port for pneumatic pressure, to deal with the kinds of motive power. The extension interface 123 may be disposed so that at least a part thereof is exposed from the upper surface of the casing 120. In this case, while the job module 13 is stacked on the holding module 12, the job module 13 is connected to the extension interface 123, and accordingly, the motive power can be supplied from the extension interface 123 to the job module 13 through the supply passage 118.

The first driving mechanism 124 is a mechanism to hold the substrate B1 that is the job object (second object). In the present embodiment, the first driving mechanism 124 has a function of conveying the substrate B1 along the X-axis direction. More specifically, the first driving mechanism 124 includes, for example, a belt conveyor or the like. The first driving mechanism 124 introduces the substrate B1 into the casing 120 from one of the paired substrate passing holes 125, and then conveys it along the X-axis direction to be discharged from the other of the paired substrate passing holes 125. The first driving mechanism 124 temporarily stops conveying the substrate B1 in the mounting space of the casing 120 until mount operation of the component P1 onto the substrate B1 is completed.

The first switch SW1 is included in the monitoring target circuit C1, as described above. For example, the first switch SW1 is switched off when a foreign substance (such as a human hand) is inserted into any of the paired substrate passing holes 125. Thus, if the foreign substance is inserted into any of the paired substrate passing holes 125, the detector 113 of the control module 11 outputs an error signal to stop supplying of the motive power (at least the electric power) from the common interface 112.

(2.4) Job Module

Figure 7:
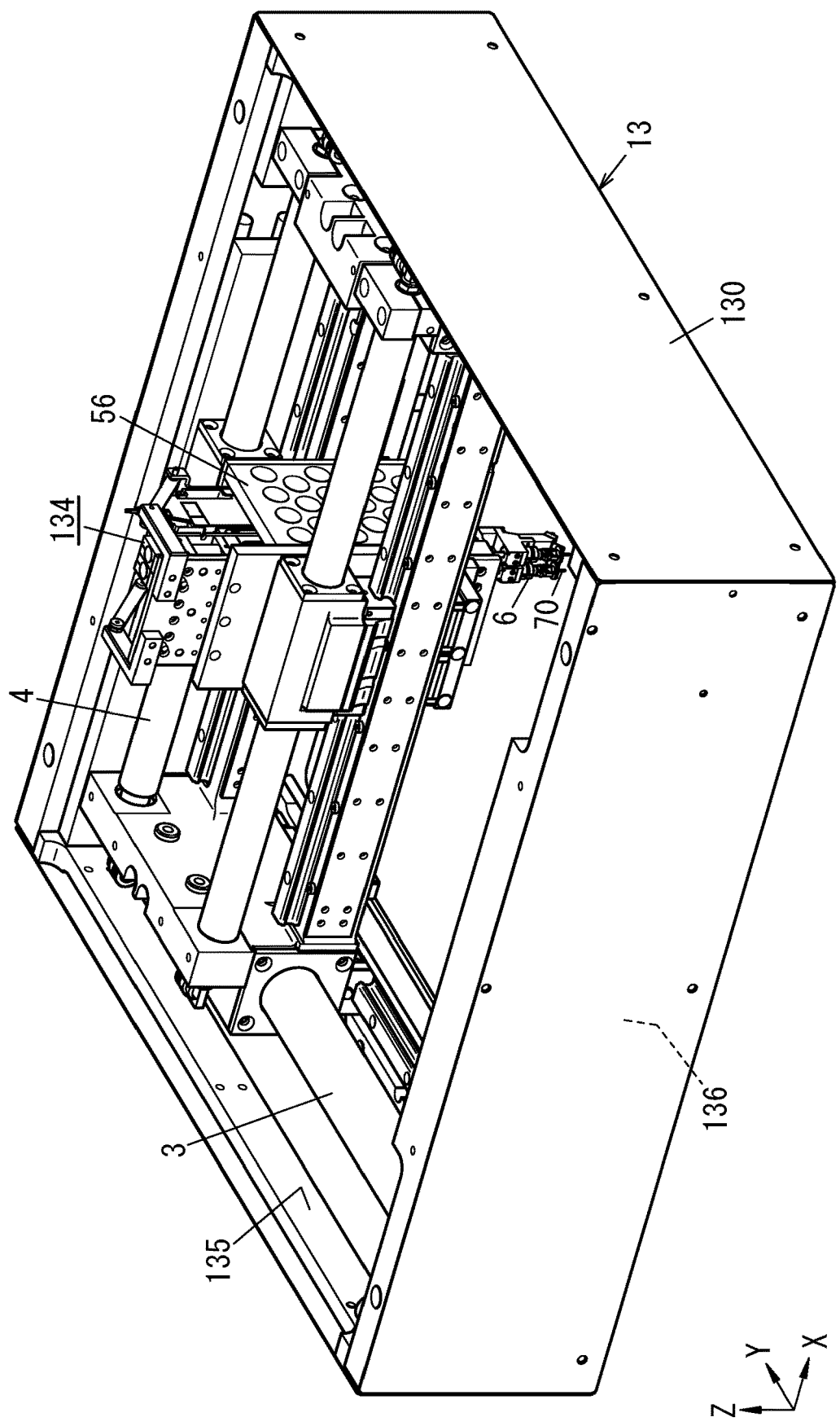
FIG. 7 is a perspective view of a job module of the manufacturing-job apparatus.

As shown in FIGS. 4 and 7, the job module 13 includes a casing 130, a second communication unit 131, a second driver 132, an extension interface 133, a second driving mechanism 134 and the second switch SW2.

The casing 130 has an approximate square shape, similar to the casing 110 of the control module 11, in planar view (when viewed from one direction along the Z-axis), and a rectangular parallelepiped shape that is flat in the Z-axis direction. The casing 130 further has an opening 135 that is formed in an upper surface of the casing 130 to leave an edge part along four sides of the upper surface. The casing 130 also has an opening 136 that is formed in a lower surface of the casing 130 to leave an edge part along four sides of the lower surface. That is, the paired openings 135, 136 penetrating in the Z-axis direction are provided in the casing 130. The casing 130 therefore have an inside space accessible from both sides thereof in the Z-axis direction through the paired openings 135, 136.

Herein similarly to the control module 11, preferably, the job module 13 further includes a pair of positioning pins projected upward from the upper surface of the casing 130. In a state where the cover module 14 is stacked on the job module 13, the respective positioning pins are inserted in paired positioning holes formed in a lower surface of the cover module 14. Thus, in the state where the cover module 14 is stacked on the job module 13, the job module 13 and the cover module 14 can be relatively positioned in the X-axis and Y-axis directions. Assembly work for assembling the cover module 14 with the job module 13 is therefore facilitated relatively.

The second communication unit 131 is disposed in the casing 130. The second communication unit 131 is connected to the communication unit 111 of the control module 11 with a signal line, and bidirectionally communicates with the communication unit 111 through the signal line.

The second driver 132 is a driver to drive the second driving mechanism 134. The second driver 132 is connected to the common interface 112 of the control module 11, and obtains, from the common interface 112, at least the motive power needed for driving the second driving mechanism 134. In the present embodiment, since the second driving mechanism 134 is operated with the electric power and the pneumatic pressure as the motive power, the second driver 132 obtains at least the electric power and the pneumatic pressure from the common interface 112. The second driver 132 may include a control circuit for controlling the second driving mechanism 134.

The extension interface 133 is an interface to supply the motive power to another module that is connected on a downstream side of the supply passage 118 in which the motive power is supplied from the common interface 112. When focused on the job module 13, the cover module 14 is connected on the downstream side of the supply passage 118, and the extension interface 133 is accordingly an interface to supply the motive power to the cover module 14 (another module). In the example of FIG. 4, an illustration of the supply passage for supplying the motive power from the extension interface 133 to the cover module 14 is omitted.

Similarly to the common interface 112, the extension interface 133 includes a plurality of kinds of connection parts, such as a terminal (connector) for electrical connection and a connection port for pneumatic pressure, to deal with the kinds of motive power. The extension interface 133 may be disposed so that at least a part thereof is exposed from the upper surface of the casing 130. In this case, while the cover module 14 is stacked on the job module 13, the cover module 14 is connected to the extension interface 133, and accordingly, the motive power can be supplied from the extension interface 133 to the cover module 14 through the supply passage.

The second driving mechanism 134 is a mechanism to mount the component P1 as the first object on the substrate B1. The second driving mechanism 134 includes a mount head unit 56, an X-axis moving device 4 and a Y-axis moving device 3. The mount head unit 56 includes a picking-up part 70 for picking-up the component P1 and an actuator 6 for moving the picking-up part 70. In the manufacturing job apparatus 1 according to the present embodiment, the mount head unit 56 includes a plurality of the picking-up parts 70 (two picking-up parts herein) and a plurality of the actuators 6 (two actuators herein). Therefore, the mount head unit 56 can pick up a plurality of the components P1 (two components herein), simultaneously.

The picking-up part 70 includes a suction nozzle, for example. The picking-up part 70 is controlled by the second driver 132 to be switchable between a picking-up state of picking-up (holding) the component P1 and a release state of releasing the component P1 (i.e., cancelling the picking-up). The picking-up part 70 is not limited to the suction nozzle, but may be configured to pick up (hold) the component P1 by putting (clipping) the component P1 between two or more members, as a robot hand. The actuator 6 allows the picking-up part 70 to move linearly in the Z-axis direction. The actuator 6 further allows the picking-up part 70 to rotate in a rotating direction (hereinafter, referred to as a "θ direction") around an axis line along the Z-axis direction. The X-axis moving device 4 allows the mount head unit 56 to move linearly in the X-axis direction. The Y-axis moving device 3 allows the mount head unit 56 to move linearly in the Y-axis direction. In this manner, the second driving mechanism 134 can allow the picking-up part 70 to move in the X-axis, Y-axis, Z-axis and θ directions.

In the present embodiment as one example, the second driving mechanism 134 drives the picking-up part 70, using a driving force generated by a linear motor, relative to movement of the picking-up part 70 in the X-axis, Y-axis and Z-axis directions. The second driving mechanism 134 drives the picking-up part 70, using a driving force generated by a rotary motor, relative to movement of the picking-up part 70 in the θ direction. The second driving mechanism 134 operates, receiving supply of the pneumatic pressure (vacuum) as the motive power, relative to picking up of the component P1 by the picking-up part 70. In other words, the second driving mechanism 134 opens or closes a valve on a supply passage of the pneumatic pressure (vacuum) communicated with the picking-up part 70 to switch between the picking-up state and the release state of the picking-up part 70.

The second switch SW2 is included in the monitoring target circuit C1, as described above. For example, the second switch SW2 is switched off when a foreign substance (such as a human hand) is inserted into any of the paired openings 135, 136. Thus, if the foreign substance is inserted into any of the paired openings 135, 136, the detector 113 of the control module 11 outputs an error signal to stop supplying of the motive power (at least the electric power) from the common interface 112.

The mount head unit 56 preferably further includes a camera. The camera photographs for example images of: the substrate B1 with being held by the holding module 12; the component P1 with being picked up by the picking-up part 70; the component P1 with being mounted on the substrate B1; and so on. The images photographed by the camera are sent to the control module 11.

(2.5) Other Module

As shown in FIGS. 1 and 4, the cover module 14 includes a frame body 140, a door body 141 and the third switch SW3.

The frame body 140 has an approximate square shape, similar to the casing 110 of the control module 11, in planar view (when viewed from one direction along the Z-axis), and a rectangular parallelepiped shape that is flat in the Z-axis direction. The frame body 140 further has a penetration of penetrating in the Z-axis direction. The door body 141 is held to be openable and closeable with respect to the frame body 140 so as to be movable between a closing position of closing the penetration and an opening position of opening the penetration. Therefore, while the door body 141 is at the opening position, the inside space of the job module 13 is accessible through the penetration of the frame body 140.

The third switch SW3 is included in the monitoring target circuit C1, as described above. For example, the third switch SW3 is switched off when the door body 141 is moved to the opening position. Thus, if the door body 141 is opened, the detector 113 of the control module 11 outputs an error signal to stop supplying of the motive power (at least the electric power) from the common interface 112. Furthermore, as described above, if the cover module 14 as the terminal module is not connected to the job module 13, the monitoring target circuit C1 is opened at a position where the third switch SW3 should be connected, and the detector 113 accordingly outputs the error signal. For this reason, also in case the cover module 14 as the terminal module is not connected to the job module 13, the supply of the motive power (at least the electric power) from the common interface 112 is stopped.

As shown in FIGS. 3 and 4, the feeder module 15 includes a main body 150, a third communication unit 151, a third driver 152, a third driving mechanism 153 and a feeder cassette 154.

The feeder cassette 154 has therein a tape reel of holding a plurality of the components P1, and is configured to rotate the tape reel to supply the components P1 sequentially. The feeder cassette 154 has a mechanism of winding its tape after the components P1 have been taken out. For example, the feeder cassette 154 is provided for each of kinds of the components P1 built-in.

The main body 150 is configured so that at least one feeder cassette 154 is attachable therewith. The main body 150 with the at least one feeder cassette 154 being attached is housed in the recess 17 constituted by the first recess 171 of the control module 11 and the second recess 172 of the holding module 12. FIG. 3 and the like illustrate an example that only the one feeder cassette 154 is attached to the main body 150, but a plurality of the feeder cassettes 154 can be attached to the main body 150, simultaneously.

The third communication unit 151 is disposed in the main body 150. The third communication unit 151 is connected to the communication unit 111 of the control module 11 with a signal line, and bidirectionally communicates with the communication unit 111 through the signal line.

The third driver 152 is a driver to drive the third driving mechanism 153. The third driver 152 is connected to the common interface 112 of the control module 11, and obtains, from the common interface 112, at least the motive power needed for driving the third driving mechanism 153. In the present embodiment, since the third driving mechanism 153 is electrically operated, the third driver 152 obtains at least the electric power from the common interface 112. The third driver 152 may include a control circuit for controlling the third driving mechanism 153.

The third driving mechanism 153 is a mechanism to drive the feeder cassette 154. That is, the third driving mechanism 153 rotates the tape reel built-in the feeder cassette 154 to supply the components P1 sequentially from the feeder cassette 154.

As shown in FIG. 1, the signal lamp 16 includes light emission parts 161. The respective light emission parts 161 emit light with green, yellow and red colors according to the operation state of the manufacturing-job apparatus 1.

(3) Operation

The manufacturing-job apparatus 1 according to the present embodiment performs the mount job of mounting the component P1 on the substrate B1 as the job object by the following operation basically.

That is, the holding module 12 conveys the substrate B1 into the inside space of the manufacturing job apparatus 1 along the X-axis direction from the outside thereof, and holds the substrate B1 in the inside space thereof.

The job module 13 picks up, with the picking-up part 70 (refer to FIG. 2B), the component P1 fed by the feeder module 15. The job module 13 allows the picking-up part 70 with picking up the component P1 to move in the X-axis, Y-axis and Z-axis directions, and then release, at a prescribed position on the substrate B1, the component P1 picked up by the picking-up part 70, and the component P1 is therefore mounted on the substrate B1. In addition, the job module 13 allows the picking-up part 70 to rotate in the θ direction, and the direction of the component P1 can be accordingly changed in the horizontal plane (X-Y plane).

After completion of mounting the component P1 on the substrate B1, the holding module 12 conveys (discharges) the substrate B1 from the inside space of the manufacturing job apparatus 1 to the outside thereof.

(4) Variation

The First Embodiment is merely one of various embodiments of the present disclosure. Regarding the First Embodiment, numerous modifications and variations can be made according to designs and the like, as long as the purpose of the present disclosure is achieved. Hereinafter, variations of the First Embodiment will be listed. Each of the variations described below may be appropriately applied in combination with the other variation.

As a first variation of the First Embodiment, the manufacturing job apparatus 1 may include a job module that differs from the above-mentioned job module 13 in nature, quality and the like of the job. In other words, the control module 11, the holding module 12 and the like may be combined with e.g., a job module of executing a job of coating, printing, pressing, cutting, welding or photographing with respect to the job object (i.e., a job except the mounting). As one example, the job object may be a glass substrate with a surface on which a semiconductor chip is disposed. In this case, the job module may press the semiconductor chip against the glass substrate to execute a job of pressure bonding the semiconductor chip on the glass substrate. As another example, the job module may be configured to mount a component P1 on a substrate B1 while depositing an adhesive or paste such as flux on a lower surface of the component P1, similarly to the mounting apparatus disclosed in the Document 1 (JP 2017-168539 A). As yet another example, the job module may be configured to allow a component P1 to move in the X-axis, Y-axis and Z-axis directions, using a rotary motor and a ball screw. In such the job module, it is possible to more reduce cost of the job module (although quality (speed) of job may be worse), compared with the job module 13 using the linear motor.

As a second variation of the First Embodiment, the manufacturing job apparatus 1 may include a holding module that differs from the above-mentioned holding module 12 in nature, quality and the like of the job. In other words, for example used may be a holding module that holds as the job object a flexible substrate such as plastic, paper, metal foil or flexible glass, in case the manufacturing job apparatus 1 is used for manufacturing a product applying Flexible Hybrid Electronics technology. As another example, used may be a holding module that holds as the job object a material such as a cloth or medicinal drug, in case the manufacturing job apparatus 1 is used for manufacturing Smart Fabrics or Digital Medicine. As yet another example, the holding module may be configured to hold, as the job object, a three-dimensional structure such as a casing, and in this aspect, it preferably allows various surfaces of the job object to direct to the job module 13 (upward) by so-called three-dimensional conveyance. It is not essential that the holding module firmly holds the job object, but the holding module may hold the job object with being floated by air, for example.

A facility where the manufacturing job apparatus 1 is used is not limited to a factory, but may be a research laboratory, office, store, educational institution or the like. In particular, the manufacturing-job apparatus 1, for example when with a relatively small size one side of which is approximately equal to or less than 1000 mm, can be easily installed even in the facility as the research laboratory or the like where an installation space is hardly secured. By the installation to such the facility, the manufacturing-job apparatus 1 can be used for production of many kinds in small quantities or manufacturing of trial products, for example.

In the First Embodiment the feeder module 15 can be physically separated from the holding module 12, but it is not limited to such a configuration. The feeder module 15 may be provided integrally with the holding module 12. In this case, the holding module 12 may have a function of feeding the component P1 as the first object to the job module 13 in addition to a function of holding the substrate B1 as the second object.

The manufacturing job apparatus 1 is needed to include at least the control module 11, the holding module 12 and the job module 13, but the cover module 14, the feeder module 15 and the signal lamp 16 are not essential elements for the manufacturing-job apparatus 1. As a result, at least one of the cover module 14, the feeder module 15 and the signal lamp 16 can be appropriately omitted. In case the cover module 14 is omitted, the monitoring target circuit C1 is preferably made as closed circuit, using e.g., a short-pin or the like for short-circuiting the monitoring target circuit C1 instead of the third switch SW3 so that the detector 113 does not output the error signal.

The communication system for the communication unit 111 of the control module 11 is not limited to the exemplary systems in the First Embodiment. For example, the communication unit 111 may be configured to communicate, using a suitable wire communication system (including Power Line Carrier communication) or wireless communication system, with each of the holding module 12 and the job module 13.

The mount head unit 56 of the job module 13 is not limited to a configuration with two picking-up parts 70 and two actuators 6. For example, the mount head unit 56 may include a single picking-up part 70 and a single actuator 6, or include three or more picking-up parts 70 and three or more actuators 6.

The holding module 12 and the job module 13 may be connected in parallel to the control module 11 on the supply passage 118 of the motive power from the common interface 112 of the control module 11.

The shapes and the dimensions of the modules and the like of the manufacturing-job apparatus 1 described above are merely examples and modifications thereof may be appropriately made.

Second Embodiment

Figure 8:
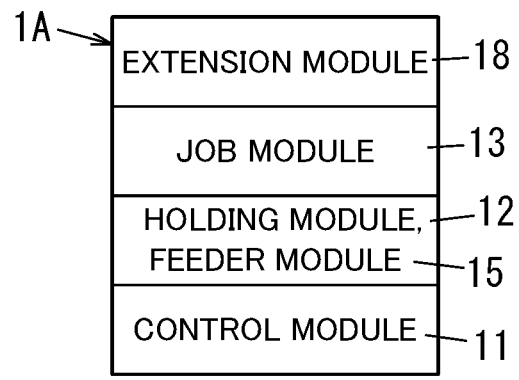
FIG. 8 is a block diagram showing a schematic configuration of a manufacturing job apparatus according to a Second Embodiment.
Figure 9:
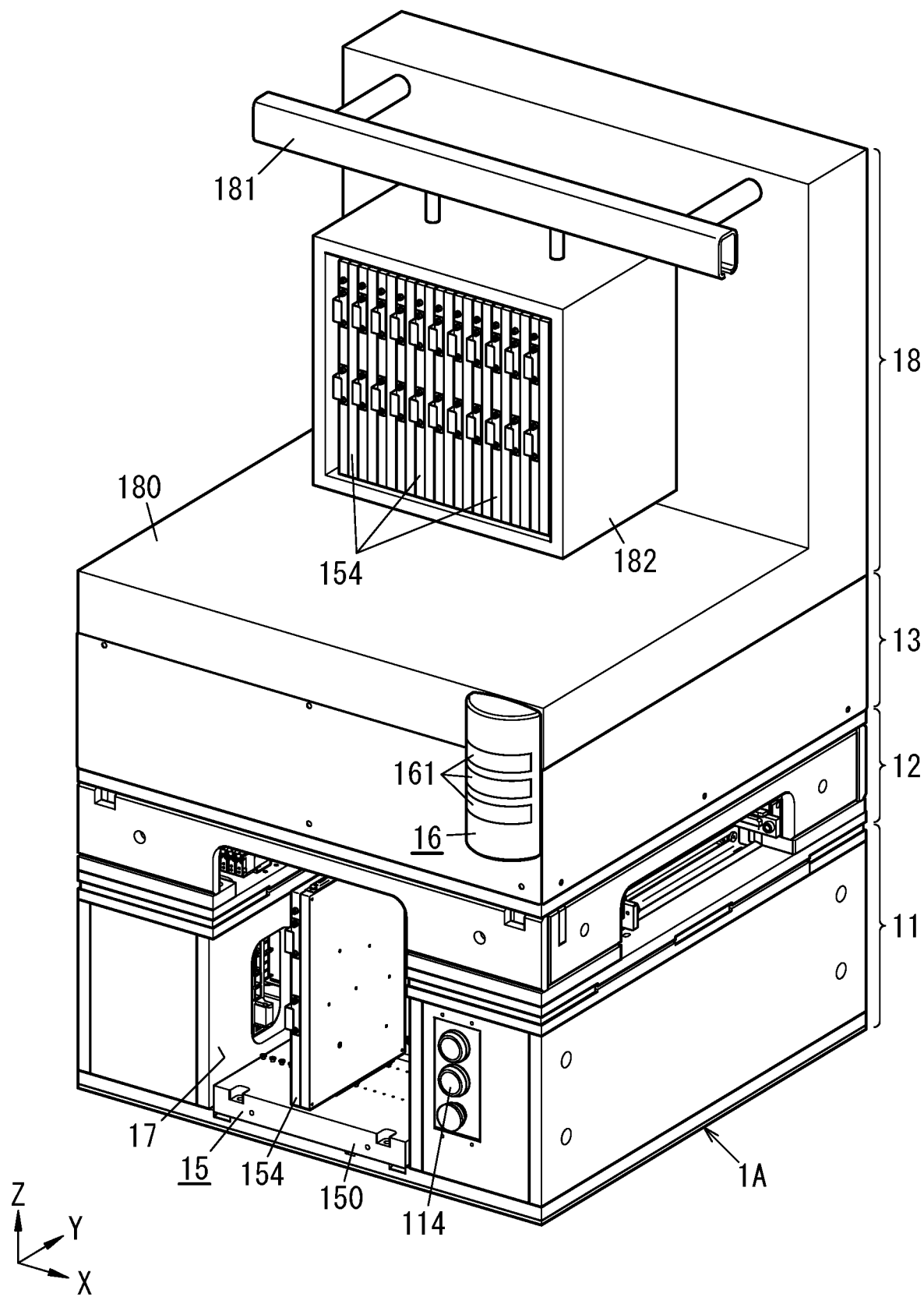
FIG. 9 is a perspective view of an external appearance of the manufacturing job apparatus.

As shown in FIGS. 8 and 9, a manufacturing job apparatus 1A according to the present embodiment differs from the manufacturing job apparatus 1 according to the First Embodiment in that the manufacturing-job apparatus 1A further includes an extension module 18. Hereinafter, elements similar to those of the First Embodiment are assigned with same reference signs and explanations thereof are appropriately omitted.

In the present embodiment, the manufacturing job apparatus 1A includes the extension module 18 instead of the cover module 14 (refer to FIG. 1). More specifically, in the present embodiment a control module 11 is provided at the bottom (as the lowest stage), and a holding module 12, a job module 13 and the extension module 18 are combined with the control module 11 to be stacked in that order on the control module 11. In the present embodiment the extension module 18 corresponds to a terminal module that, on a supply passage of motive power, is provided on most downstream of a plurality of modules connected in series to the control module 11.

The extension module 18 is connected to an extension interface 133 of the job module 13 and further has a function for communicating with the control module 11. In other words, similarly to the holding module 12 and the job module 13, the extension module 18 is configured to receive the motive power supplied from the control module 11, and be controlled by the control module 11. The extension module 18 as above may be also appropriately selected according to functions to be needed for the manufacturing job apparatus 1A from more kinds of modules respectively having functions different from each other. Accordingly, it is possible to provide an appropriate extension function to the manufacturing job apparatus 1A.

In the example of FIG. 9 the extension module 18 includes a casing 180, a fourth driving mechanism 181 and a housing box 182. The extension module 18 has a function of conveying a feeder cassette 154.

More specifically the fourth driving mechanism 181 is a mechanism to allow the housing box 182 to move linearly in the X-axis direction with respect to a rail supported by the casing 180. The housing box 182 can house therein a plurality of the feeder cassettes 154. In case a plurality of the extension modules 18 are arranged in the X-axis direction or the rail of the fourth driving mechanism 181 is extended in the X-axis direction, the extension module 18 can convey the feeder cassettes 154 housed in the housing box 182.

A variation of the Second Embodiment may further include a cover module 14, and the cover module 14 may be connected to the extension module 18.

The configurations disclosed in the Second Embodiment (including the variation) may be suitably applied in combination with the configurations disclosed in the First Embodiment (including the variation).

Third Embodiment

Figure 10A:
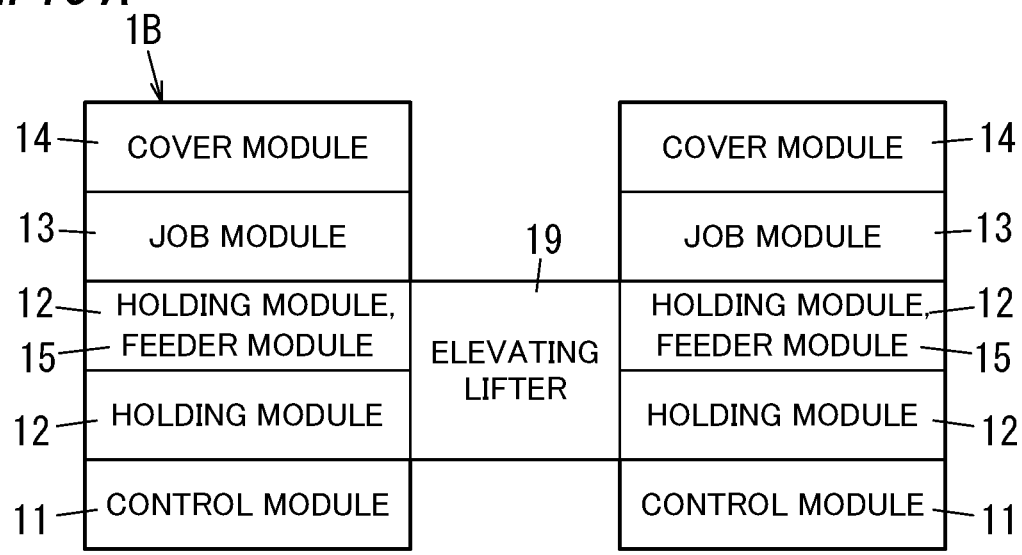
FIG. 10A is a block diagram showing a schematic configuration of a first configuration example of a manufacturing job apparatus according to a Third Embodiment.
Figure 10B:
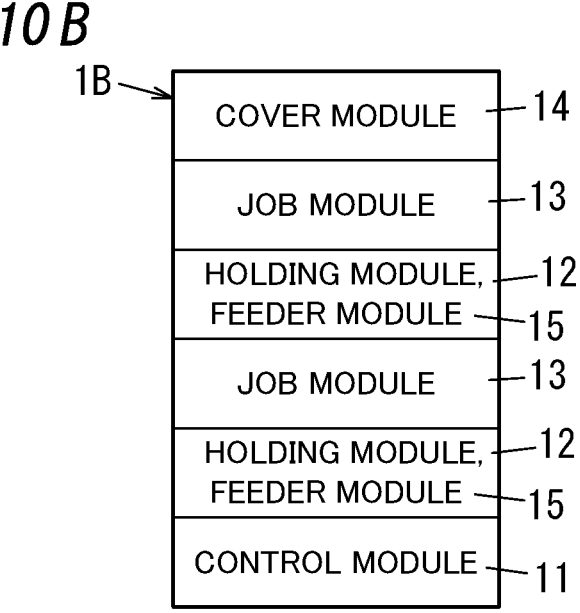
FIG. 10B is a block diagram showing a schematic configuration of a second configuration example of the manufacturing job apparatus according to the Third Embodiment.

As shown in FIGS. 10A and 10B, a manufacturing-job apparatus 1B according to the present embodiment differs from the manufacturing job apparatus 1 according to the First Embodiment in that a holding module 12 comprises a plurality of holding modules 12, and/or a job module 13 comprises a plurality of job modules 13. Hereinafter, elements similar to those of the First Embodiment are assigned with same reference signs and explanations thereof are appropriately omitted.

FIG. 10A shows a first configuration example of the manufacturing job apparatus 1B. The first configuration example has a configuration that two holding modules 12, one job module 13, one feeder module 15 and one cover module 14 are stacked on a control module 11. In the example of FIG. 10A, the manufacturing job apparatus 1B has two sets each of which includes the control module 11, the two holding modules 12, the one job module 13, the one feeder module 15 and the one cover module 14. The manufacturing job apparatus 1B further includes an elevating lifter 19 that connects the two sets.

In this configuration the elevating lifter 19 is configured to convey the substrate B1 between the holding modules 12 respectively provided at lower stages of the two sets. The elevating lifter 19 is also configured to convey the substrate B1 between the holding modules 12 respectively provided at upper stages of the two sets. In each set, the holding module 12 at the lower stage conveys the substrate B1 so that the substrate B1 is conveyed rightward in FIG. 10A, for example. While the holding module 12 at the lower stage conveys the substrate B1, the job module 13 does not mount the component Pb. In each set, the holding module 12 at the upper stage conveys the substrate B1 so that the substrate B1 is conveyed leftward in FIG. 10A, for example. While the holding module 12 at the upper stage conveys the substrate B1, the job module 13 mounts the component P1. In this manner, for example, the elevating lifter 19 turns over the substrate B1 while conveying the substrate B1 between the holding modules 12 at the upper stages of the two sets, and the components P1 can be therefore mounted on both surfaces of the substrate B1.

FIG. 10B shows a second configuration example of the manufacturing job apparatus 1B. The second configuration example has a configuration that two holding modules 12, two job modules 13, two feeder modules 15 and one cover module 14 are stacked on a control module 11. The two holding modules 12 and the two job modules 13 are stacked on the control module 11 in order of a first holding module 12, a first job module 13, a second holding module 12 and a second job module 13.

In this configuration it is possible to realize a function similar to a case where two manufacturing job apparatuses 1 according to the First Embodiment are stacked along the Z-axis. In other words, the second configuration example of the manufacturing job apparatus 1B can simultaneously execute two jobs (mount jobs) with the two job modules 13.

The manufacturing job apparatus 1B according to the Third Embodiment is not limited the above-mentioned examples as long as the holding module 12 comprises a plurality of holding modules 12 and/or the job module 13 comprises a plurality of job modules 13. For Example, the holding module 12 may comprise three or more holding modules 12 and/or the job module 13 may comprise three or more job modules 13.

The configurations disclosed in the Third Embodiment (including the variation) may be suitably applied in combination with the configurations disclosed in the First Embodiment and the Second Embodiment (including the variations).

CONCLUSION

As apparent from the above-mentioned embodiments, a manufacturing job apparatus (1, 1A, 1B) of a first aspect includes a control module (11), a holding module (12), and a job module (13). The holding module (12) is configured to hold a job object. The job module (13) is configured to execute a job for the job object. The control module (11) includes a communication unit (111) and a common interface (112). The communication unit (111) is configured to communicate with each of the holding module (12) and the job module (13). The common interface (112) is configured to supply motive power to both of the holding module (12) and the job module (13).

According to this aspect, the holding module (12) and the job module (13) to be combined with the control module (11) can be selected from various kinds of modules, and the manufacturing job apparatus (1, 1A, 1B) is easily changeable in nature, quality and the like of an executable job. That is, changing the holding module (12) or the job module (13) to be combined with the control module (11) can easily change in nature, quality and the like of an executable job, as the manufacturing job apparatus (1, 1A, 1B).

Regarding a manufacturing job apparatus (1, 1A, 1B) of a second aspect, in the first aspect, the holding module (12) and the job module (13) are connected, in series to the control module (11), on a supply passage (118) through which the motive power is supplied from the common interface (112).

According to this aspect, the number of ports of the common interface (112) can be more suppressed, compared with a case where the holding module (12) and the job module (13) are connected in parallel to the control module (11).

Regarding a manufacturing-job apparatus (1, 1A, 1B) of a third aspect, in the second aspect, each of the holding module (12) and the job module (13) includes an extension interface (123, 133) for supplying the motive power to another module that is connected on a downstream side of the supply passage (118).

According to this aspect, the motive power can be supplied, through the extension interface (123, 133), from each of the holding module (12) and the job module (13) to another module.

A manufacturing job apparatus (1, 1A, 1B) of a fourth aspect, in the second aspect or the third aspect, further includes a terminal module. The terminal module is one of a plurality of modules including the holding module (12) and the job module (13), which are connected in series to the control module (11). On the supply passage (118), the terminal module is provided on most downstream of the plurality of modules. The control module (11) further includes a detector (113) configured to detect whether or not the terminal module is in connection with the control module (11).

According to this aspect, it is possible to confirm whether or not the manufacturing job apparatus (1, 1A, 1B) has been correctly assembled based on a detection result about whether or not the terminal module is in connection with the control module (11).

Regarding a manufacturing-job apparatus (1, 1A, 1B) of a fifth aspect, in any one of the first to fourth aspects, the job includes mounting a first object on a second object as the job object.

According to this aspect, the manufacturing job apparatus (1, 1A, 1B) can be used as a mounting apparatus. For example, various kinds of first objects can be mounted by replacing only the job module (13).

A manufacturing job apparatus (1, 1A, 1B) of a sixth aspect, in the fifth aspect, further includes a feeder module (15) configured to feed the first object to the job module (13).

According to this aspect, it is possible to automate feeding of the first object to the job module (13).

Regarding a manufacturing job apparatus (1, 1A, 1B) of a seventh aspect, in any one of the first to sixth aspects, the holding module (12) comprises a plurality of holding modules (12), and/or the job module (13) comprises a plurality of job modules (13).

According to this aspect, it is possible to realize manufacturing job apparatuses (1, 1A, 1B) with various forms.

Regarding a manufacturing job apparatus (1, 1A, 1B) of an eighth aspect, in any one of the first to seventh aspects, the holding module (12) includes a conveyance device for conveying the job object.

The configurations according to the second to eighth aspects are not essential for the manufacturing job apparatus (1, 1A, 1B), and may be appropriately omitted.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A manufacturing job apparatus, comprising:
a control module including a first case with a first recess;
a holding module including a first driving mechanism that holds a job object, wherein the holding module is disposed over the control module and includes a second case with a second recess;

a feeder module containing components, the feeder module housed in a third recess formed by the first recess and the second recess; and a job module disposed over the holding module, wherein the job module includes a second driving mechanism configured to pick up a component from the feeder module and to mount the component onto the job object, the control module comprising including:
- a communication circuit configured to communicate with each of the holding module and the job module; and
- a common interface configured to supply motive power to both of the holding module and the job module.

2. The manufacturing-job apparatus of claim 1, wherein the holding module and the job module are connected, in series to the control module, on a supply passage through which the motive power is supplied from the common interface.

3. The manufacturing-job apparatus of claim 2, wherein each of the holding module and the job module includes an extension interface for supplying the motive power to another module that is connected on a downstream side of the supply passage.

4. The manufacturing-job apparatus of claim 2, further comprising a terminal module, wherein:
- the terminal module is one of a plurality of modules including the holding module and the job module, which are connected in series to the control module;
- on the supply passage, the terminal module is provided on most downstream of the plurality of modules; and
- the control module further includes a detector configured to detect whether or not the terminal module is in connection with the control module.

5. The manufacturing-job apparatus of claim 1, wherein the holding module comprises a plurality of holding modules, and/or the job module comprises a plurality of job modules.

6. The manufacturing-job apparatus of claim 1, wherein the holding module includes a conveyance device for conveying the job object.

7. The manufacturing-job apparatus of claim 3, further comprising a terminal module, wherein:
- the terminal module is one of a plurality of modules including the holding module and the job module, which are connected in series to the control module;
- on the supply passage, the terminal module is provided on most downstream of the plurality of modules; and
- the control module further includes a detector configured to detect whether or not the terminal module is in connection with the control module.

8. The manufacturing-job apparatus of claim 2, wherein the holding module comprises a plurality of holding modules, and/or the job module comprises a plurality of job modules.

9. The manufacturing-job apparatus of claim 3, wherein the holding module comprises a plurality of holding modules, and/or the job module comprises a plurality of job modules.

10. The manufacturing-job apparatus of claim 4, wherein the holding module comprises a plurality of holding modules, and/or the job module comprises a plurality of job modules.

11. The manufacturing job apparatus of claim 6, wherein the holding module comprises a plurality of holding modules, and/or the job module comprises a plurality of job modules.

12. The manufacturing job apparatus of claim 7, wherein the holding module comprises a plurality of holding modules, and/or the job module comprises a plurality of job modules.

13. The manufacturing job apparatus of claim 2, wherein the holding module includes a conveyance device for conveying the job object.

14. An operation method of a manufacturing-job apparatus, the manufacturing job apparatus comprising:
- a control module including a first case with a first recess;
- a holding module including a first driving mechanism that holds a job object, wherein the holding module is disposed over the control module and includes a second case with a second recess;
- a feeder module containing components, the feeder module housed in a third recess formed by the first recess and the second recess; and
- a job module disposed over the holding module, wherein the job module includes a second driving mechanism configured to pick up a component from the feeder module and to mount the component onto the job object, the operation method comprising:
- with the control module, communicating with each of the holding module and the job module; and
- from the control module, supplying motive power to both of the holding module and the job module.

* * * * *